United States Patent Office 3,008,158
Patented Nov. 14, 1961

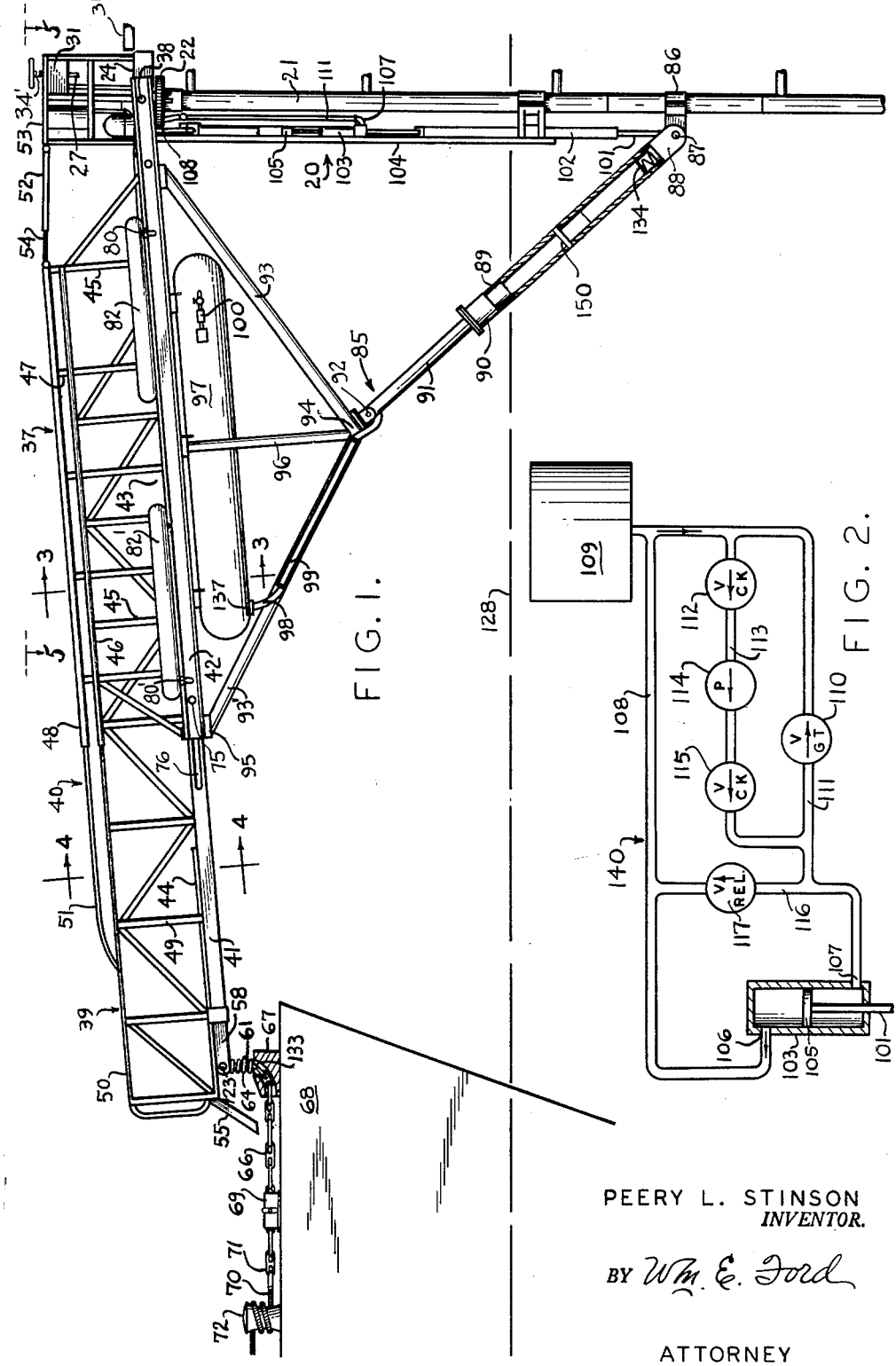

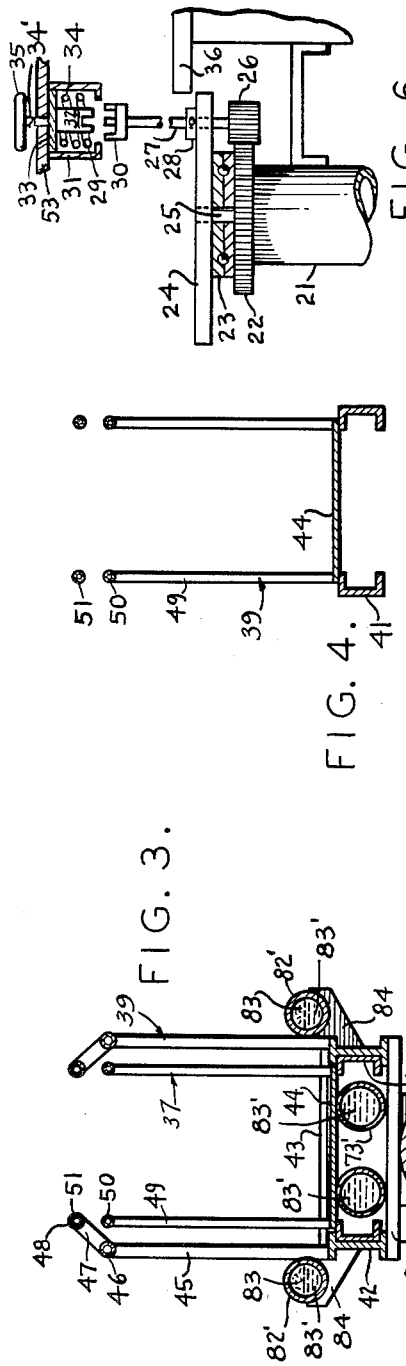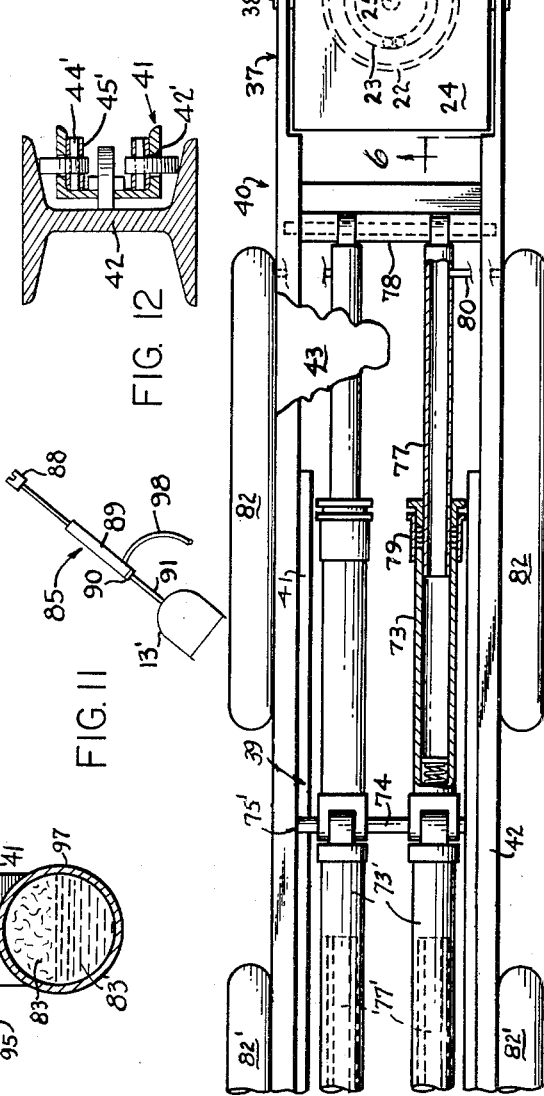

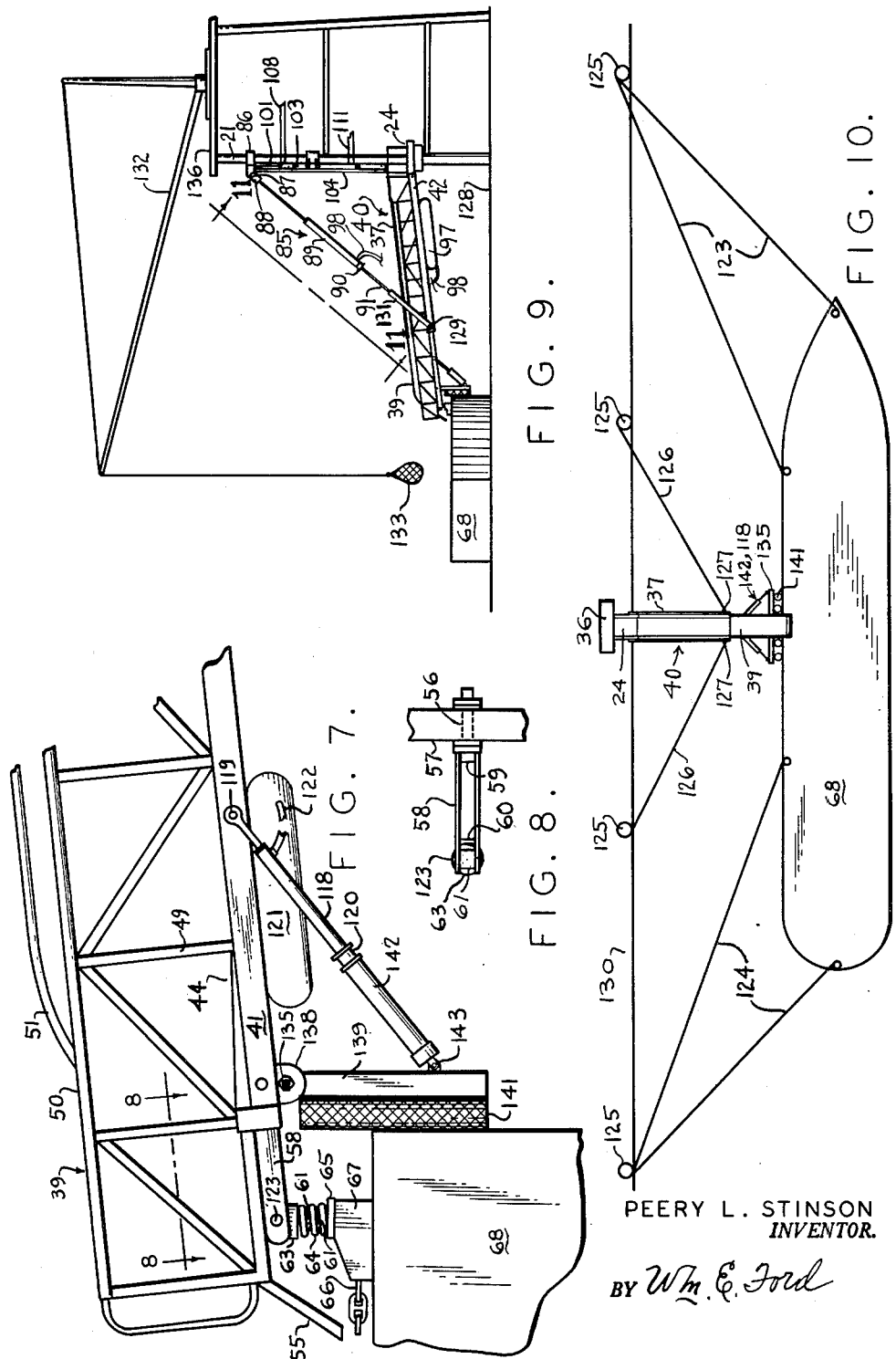

3,008,158
UNIVERSAL MOORING AND RAMP
Peery L. Stinson, Henderson, Ark.; Dorothy B. Stinson, administratrix of said Peery L. Stinson, deceased
Filed Aug. 25, 1954, Ser. No. 452,121
3 Claims. (Cl. 14—71)

This invention relates to a universal mooring and ramp, the ramp being intertelescoping and affording a universal connection to a swinging, pitching, rolling, and yawing vessel on a rough sea, the support for the ramp being self-adjustable to accommodate for variations in water level and variations in vessel freeboard, and the platform from which the ramp extends being automatically traversable responsive to vessel movements. Such an invention solves a long unfulfilled need for means providing structure inherent within itself which can compensate for all of the stresses and strains heretofore imposed both upon vessels attached to ramps or mooring structures, and upon such ramps and mooring themselves, both under normal seaside and tidal affected conditions, and under storm and heavy weather conditions. The invention also minimizes hazard to goods carried thereon and to personnel traversing it, and includes safeguarding means in its own elements which protects it structurally from the heavy usage it must withstand.

It is therefore an object of this invention to provide a universal ramp and mooring which is adapted to compensate for the swinging, pitching, rolling and yawing of a water borne vessel connected thereto, and which compensates for variations in water level and for variations in the freeboard of a vessel or vessels attached thereto.

It is also an object of this invention to provide a universal ramp and mooring of this class which is adapted for connection to the bow of a vessel, or to have a vessel connected broadside thereto.

It is a further object of this invention to provide a universal ramp and mooring of this class which may provide adjustment for variation of water level and freeboard locatable either above or below the ramp platform.

It is yet another object of this invention to provide a universal ramp and mooring of this class which provides motion dampening or snubbing means for the various relative movable parts thereof.

It is yet a further object of this invention to provide a universal ramp and mooring of this class which has a ramp platform which is automatically traversable responsive to movement of a vessel connected to the ramp, or which is manually traversable.

Other and further objects will be apparent when the specification is considered in connection with the drawings in which:

FIG. 1 is a longitudinal elevational view of the invention;

FIG. 2 is a diagrammatic view of the fluid control system compensating for vessel freeboard and water level;

FIG. 3 is a transverse sectional elevation taken along line 3—3 of FIG. 1;

FIG. 4 is a transverse sectional elevation taken along line 4—4 of FIG. 1;

FIG. 5 is a partial plan view with walkway removed, taken along line 5—5 of FIG. 1;

FIG. 6 is a fragmentary elevation, partially diagrammatic, taken along line 6—6 of FIG. 5 with the ball-bearing assembly beneath the platform shown in cross-section, and with the pivot pin for the platform connected ramp section omitted;

FIG. 7 is a fragmentary sectional elevation of a modification of the outboard end of the invention;

FIG. 8 is a fragmentary plan view taken along line 8—8 of FIG. 7;

FIG. 9 is a longitudinal sectional elevation of a modification of the invention;

FIG. 10 is a plan view of the invention employed in mooring a vessel;

FIG. 11 is a view taken along line 11—11 of FIG. 9; and

FIG. 12 is a modification of inter-telescoping ramp construction.

Referring particularly to the drawings:

FIG. 1 shows a universal mooring and ramp 20 including a support 21 which may be a column, a piling driven into the earthen floor below a body of water or into the shore adjacent to such body of water. It also may be an integral part of a dock or pier or in cases it may be a structure connected to a water borne platform, as a tidelands oil well drilling platform, or to a modern water borne, stabilized aircraft landing platform. As shown in FIG. 6, the support 21 has a large gear 22 rigidly fixed to the top thereof, and such gear supports on its upper face a ball bearing assembly 23. In turn the ball bearing assembly 23 supports a platform 24 and is connected to such assembly against lateral motion with relation thereto by means of a shaft 25 which is fixed to the platform 24 and is journalled centrally in the body of the ball bearing assembly 23.

A shaft 27 extends parallel to the shaft 25 and is journalled in the platform 24 and held against sliding downwardly by means of a collar 28 pinned to the shaft 27 to bear upon the upper surface of the platform 24. A pinion 26 is fixed to the lower end of the shaft 27 to mesh with the gear 22. The shaft 27 extends upwardly above the platform 24 and terminates at its upper end in a clutch jaw 30. A housing 31 is rigidly supported by and connected to, a railing 53, shown diagrammatically and in section in FIG. 6 to indicate that such railing 53 stands above the platform 24 and is supported thereby. Such housing 31 surrounds a clutch jaw 32, which is designed for engagement with the clutch jaw 30. A plate 33 forms the backing for the clutch jaw 32 and slides within the housing 31, and a spring 34 of larger diameter than the clutch jaw 32 bears downwardly on a flange 29 at the base of the housing 31 and upwardly against the plate 33 and normally urges the plate 33 upwardly against the railing member 53 whereby the upper clutch jaw 32 carried by the plate 33 is translated out of engagement with the lower clutch jaw 30. A shaft 34' is rigidly connected to the plate 33 and extends upwardly with clearance through the housing 31 to terminate in a hand wheel 35. Thus when the handwheel 35 is urged downwardly the clutch jaw 32 may engage the clutch jaw 30 as the spring 34 is compressed by the plate 33, and thereafter the handwheel 35 may be turned to rotate the shaft 27 by virtue of the clutch jaw engagement 32, 30, so that the pinion 26 on the shaft 27 is rotated about the gear 22.

It can thus be seen that in cases where it may be desired to manually rotate the platform 24 upon its supporting column 21, it is only necessary to urge downwardly upon the handwheel 35 to engage the clutch jaws 32, 30 and then rotate the handwheel 35 to rotate the platform 24. As shown in FIG. 6 the platform 24 is adjacent a structure as a wharf, pier or deck 36, but not at the same level therewith, so that the platform may be rotated with relation to the deck, and so that traffic may be conducted between such deck and the platform at whatever angular position the platform may take in rotation.

Referring collectively to FIGS. 1, 3, 4, and 5 a ramp 40 having an inner section 37 is shown pivotally connected to pins 38 which extend sidewardly from the platform 24 and such ramp 40 includes an outer ramp section 39 which has channel side members 41 which are slidable in I-beam side members 42 on the inner ramp section 37. A walkway 43 cross-connects the tops of the I-beams 42 of the inner ramp section 37 and a walkway 44 cross-connects the tops of the channels 41 of the outer ramp section 39. Uprights 45 are provided at spaced distances apart along each side of the walkway 43 upon the I-beams 42 to support a longitudinally extending rail 46, and to cooperate with such rail 46 in trussing the ramp section 37, and cross-pieces 47 extend angularly upwardly and inwardly from the rail 46 to support the tubular handrail 48. Uprights 49 are provided at spaced apart distances along each side of the walkway 44 upon the channels 41 to support a rail 50, and to cooperate with such rail 50 in trussing the ramp section 39, and a tubular handrail 51 extends from the lower end of the rail 50 to telescope into the tubular handrail 48, as best seen in FIGS. 1 and 3. On each side a tubular handrail connection member 52 is universally connected at one end to the railing 53 of the platform 24 while a smaller diameter tubular handrail connection member 54 is universally connected to the inner end of the inner ramp section 37 to telescope into the member 52.

Referring to FIGS. 1, 7, and 8, the end of the ramp section 39 has a step 55 extending downwardly therefrom and a universal connection is provided at this end for connection to either the bow or to the side of a vessel. Such connection includes a shaft or rod 56 pivotally connected to a cross-member 57 below the walkway 44, the cylindrical rod 56 in turn being connected to a channel link 58 in a manner that a head 59 of rectangular cross-section and forming the outer end of the rod 56 fits within the channel link 58 upon the web and between the flanges thereof so that the channel link must rotate with the rod 56 and consequently pivot in a plane transverse to the longitudinal axis of the ramp 40.

The outer end of the channel link 58 has the web cut away to provide an opening at 60 and a swivel half or block 61 is connected to the extending sides or flanges of the channel link and fits within the opening 60 in a manner to pivot on a pin 123 and consequently in a plane passing through the longitudinal axis of the ramp 40. This swivel half, pin, or swivel 61 extends vertically downwardly from the pin 123 and through a flange 63 which forms the upper bearing for a spring 64 which surrounds the swivel half 61 as it extends therebelow, and such swivel half 61 further extends through a floating washer 65 forming the lower bearing for the spring 64. A chain 66 is connected to the swivel half 61 below the washer 65 and extends through a hawse 67 on a vessel 68 and through a latching compressor 69 thereon. A line 70 is connected to the chain end at 71 and extended around a capstan 72 on the vessel.

In order to snub or dampen the inter-telescoping of the ramp sections 37, 39 the inner cylinders 73, and the outer cylinders 73', are pivotally connected to a cross-member 74, as shown in FIG. 5. The ends of such cross-member 74 are rigidly fixed at 75' to the channels 41 of the outer ramp section 39, which slide in the tracks therefor formed by the inner side of the I-beams 42.

The normal sliding friction between the channels 41 of the ramp section 39 and the I-beams 42 may be alleviated by conventional anti-friction means, as rollers carried in slots 42' in the channels 41. Such rollers may be mounted on shafts 44' journalled in bearing blocks 45' affixed to the webs of the beams with axes vertical or in the upper and/or lower flanges thereof with axes horizontal as shown in FIG. 12.

Cylindrical pistons 77 are pivotally mounted on a cross-member 78 which extends between and cross-connects the I-beams 42 near the inner ends thereof, and such pistons extend through stuffing boxes 79 to slide within the inner cylinders 73. In a like manner outer cylindrical pistons 77' indicated in FIG. 5 and constructed correspondingly to the pistons 77 shown toward the rear of such FIG. 5, must conversely have their outer ends pivotally mounted on a cross-member 75 corresponding in function outwardly with the inner cross-member 78, such cross member 75 having its ends extending through slots 76 in the channels 41 and outwardly thereof such ends are journalled or press-fitted into the I-beams 42 (see FIG. 1). Such cylinders, are slidable through stuffing boxes, corresponding to the stuffing boxes 79 connected into the lower cylinders 73' shown in FIG. 5.

The cylinders and pistons hereinabove described are filled with a liquid, as oil 83', and outlets are provided in the form of connections 80, which may be flexible, from the inner pistons 77 to upper tanks or chambers 82, and from outer pistons and cylinders 73' through the flexible connections 81 of substantial length, to the outer tanks or chambers 82', both the tanks and chambers 82 and 82' being partially filled with an inert gas 83, as shown for the tanks 82' in FIG. 3, such tanks being rigidly connected to the I-beams 42 by means of brackets 84.

Thus, when a vessel connected to the outer ramp section 39 is borne generally or directly toward the platform 24, as when carried by the waves or by its own power, the inner cylinders 73 slide inwardly upon the pistons 77 as the channels 41 slide inwardly within the I-beams 42, and the free space within the pistons 77 and cylinders 73 is consequently reduced so that liquid, as the oil, is forced from the pistons 77 through the connections 80 into the tanks 82 to compress the inert gas 83 therein, and the resulting increase of gas pressure dampens or snubs the inward movement of the outer ramp section 39.

As inward movement occurs the outer cylinders 73' slide inwardly over the outer pistons therein, which are connected by flexible connections 80' (see FIG. 1), into the outer tanks 82', which are carried by the I-beams 42. Such movement can take place since as stated in column 3, lines 53–59, the inner ends of the cylinders 73' are pivotally mounted on the cross-member 74 which has its ends in turn rigidly fixed to the channels 41 of the inner ramp sections 37. As best seen in FIG. 3 the inner ramp channels 41 intertelescope in to the channels 42 of the outer ramp section 39. This inward movement of the outer cylinders 73' thus increases the free space within the outer cylinders and pistons and the compressed inert gas in the tanks 82' expands and forces oil therefrom through the flexible connections 80' into the outer pistons and into the cylinders 73' to occupy the increased space therein and prevent the creation of a vacuum.

Conversely, when a vessel attached to the lower ramp section 39 is borne outwardly by the waves, or by its own power or any other force, the channels 41 slide outwardly in the I-beams 42 and the outer cylinders 73' slide outwardly upon the outer pistons 77'. As this outward movement of the cylinders 73' takes place and the cylinders 73' slide upon the pistons 77' which extend thereinto and which are pivotally mounted on the outer cross-member 75 which in turn has its ends fixed in the outer end portions of the inner ramp I-beams 42, the space within the outer cylinders 73' and pistons 77' is decreased, and oil is forced through the connection 81 into the tanks 82' to compress the gas in such tanks and thereby build up a pressure therein which dampens outward motion. At the same time, the inert gas in the inner tanks 82 is permitted to expand as the inner cylinders 73 slide outwardly on the pistons 77, and the oil is forced out of the tanks 82 into the pistons 77 and cylinders 73 to fill the increased free space therein.

In order that the ramp 40 will remain elevated when not attached to a vessel, it is necessary to have some form of support. This support must be capable of variation in elevations and angular position to accommodate for the different vertical angular positions of the ramp taken as a result of the differences of free-board of vessel, the tidal differences, and the wave motions. To this end a support structure 85 is provided for the ramp 40, and this structure is connected to a collar 86 slidable upon the support column 21, such connection being accomplished in the form of a pivotal connection 87 between a support yoke 88 and the collar 86.

A cylinder 89 has its base rigidly connected to the yoke 88 and receives therein through a stuffing box 90 a cylindrical piston 91. Such piston 91 is pivotally connected at its upper end at 92 to the junction 94 of two diagonally extending braces 93, 93' which are rigidly connected at their upper ends to the bottom plate 95 shown in FIG. 3 which ties the lower faces of the I-beams 42 together, or optionally such rigid connection may be made to the I-beams directly. For additional strength a member 96 may extend directly downward from the inner ramp section 37 and tie into the junction 94.

A tank or chamber 97 is rigidly connected to the underside of the inner ramp section 37, as shown in FIG. 1, and has a flexible connection 98 leading therefrom through a suitable support, as a sheath 99 on the support 93', to the upper end of the cylindrical piston 91. Suitable filling connections 100 are also provided in the tank 97 whereby it may be partially filled with an inert gas 83, and partially filled with a liquid as oil, which also fills the cylinder 89 and the piston 91, the proportion of gas to oil being very large.

Upon relative movement between the piston 91 and the cylinder 89, as resulting from vessel movement, if the vessel movement is such that the outer end of the ramp section 39 and the ramp 40 are drawn downwardly, the piston 91 is drawn inwardly into the cylinder 89, and the reduction of the combined space within cylinder 89 and piston 91 forces liquid upwardly through the flexible connection 98 into the tank 97 to compress the gas therein. Conversely such combined space is increased upon movement of the ramp 40, the compressed gas 83 expands and forces the oil downwardly into the increased space within the cylinder 89 and piston 91. As the proportion of the gas to the oil in the tank 97 is very large, changes of the vertical angular position of the ramp 40 do not cause any very great change in the volume of the gas in tank 97, and thus no great change of pressure occurs, and as a result no great strain is imposed on either the ramp 40 or the vessel attached thereto at its point of contact 67 with the ramp connection. In the same manner, no great amount of force is necessary to draw the ramp 40 down into connection with the vessel as when mooring.

The lower end of a piston rod 101 is rigidly connected to the collar 86 and extends upwardly therefrom through a graduated elevation guide 102 which holds the piston rod substantially parallel to the axis of the column 21, and further extends upwardly through a cylinder 103 mounted on a support frame 104 which is rigidly tied to the platform 24 and which supports the graduated guide 102. Piston rod 101 has a piston head 105 thereon to slide within the cylinder 103 and such cylinder 103 has fluid ports 106 and 107 at the upper and lower ends thereof respectively. (See FIGS. 1 and 2.)

Referring to FIG. 1 when considered in connection with the diagram of FIG. 2, generally designated as a fluid control system 140, if the ramp 40 is borne upwardly with the vessel 68, until a stop 150 on the periphery of piston 91 arrives at a stop position on the inner end of the stuffing box 90, such arrangement being well known and consequently not shown, fluid from the tank 97 will return through the flexible connection 98 to the piston 91 and cylinder 89 to relieve the gas pressure in the tank 97, and all downwardly acting force against the pivotal connection 87 will be relieved. Then, if the ramp 40 is further lifted, the connection pin 87 will be lifted, and with it the collar 86 and the piston rod 101 connected thereto, and the piston rod 105 within the cylinder 103 upon being thus moved upwardly will create a vacuum in the lower end of such cylinder below the piston head. A pump 114, shown in the fluid system 140 of FIG. 2 is normally open, and a gate valve 110 in such system is normally closed. The creation of vacuum in the lower end of cylinder 103 will draw oil from a reservoir 109 through a line or conduit 113 and through check valve 112 therein, through the open pump 114, and a check valve 115 into lower port or opening 107 to fill the lower end of the cylinder 103 below the piston head 105 and relieve the vacuum thus created. When the vacuum no longer exists, the check valves 112 and 115 will close, and the piston head 105 and the piston rod 101 and pin 87 connected thereto will be locked at this elevation.

The pump 114 may be manually operated thereafter to draw liquid from the reservoir 109 and deliver it through the line 113 and port 107 to further lift the piston head 105.

If the ramp 40 is borne downwardly with the vessel 68 to move the piston 91 downwardly in the cylinder 89 against a buffer spring 134 therein to force downwardly against the bottom of the cylinder 89, an increased strain is imposed upon the connection pin 87, and a downward force is exerted by the pull of the pin 87 upon the piston rod 101 and piston head 105 within the cylinder 103, so that the pressure exerted upon the oil below the piston head 105 within the cylinder 103 will cause the oil to be forced out through the port 107, line 116, so that the relief valve 117 in the line 111 is lifted; the check valve 115 being forced seated by the liquid pressure and the gate valve 110 being closed.

The liquid may thus flow into the line 108 to the reservoir 109 or through the port 106 into the top of the cylinder 103 as the piston head 105 descends. Thus the collar 86 is lowered and the included angle between the support 94 and the piston 91-cylinder 89 axis is increased to accommodate any out of the ordinary decrease in the free-board of the vessel attached thereto, and any untoward falling of the water level 128 as by the falling of the tides. The position of the connection pin 87, and of the collar 86 and yoke 88 and element attached thereto, also may be lowered manually, when desired by opening the gate valve 110 to let liquid flow from the lower end of the cylinder 103 through the port 107, line 113, and line 111 to the reservoir 109.

In cases where the ranges of free-board variation and tidal differences or water level changes are within limits, structure may be employed in which the connection pin 87 or collar 86 may be fixed in elevation, thereby eliminating requirement of the piston 105 and cylinder 103 and the fluid control system 140.

However, where conditions are such that the piston 91 must be of some substantial length in order to obviate necessity for the fluid control or adjustment and its elements, care must be taken that thickness proportions are such that the piston 91 will not bend in compression.

As shown in FIG. 1, the ramp 40 is connected to the bow of the vessel 68. Considering FIGS. 7 and 10, it can be seen how connection can be made to the side of a vessel as well. For such purpose an outrigger pipe 135 is journalled in brackets 138 on the outer ends of channels 41 and such pipe has downwardly extending, spaced apart support members 139 rigidly connected thereto which fenders 141 are connected for backing so as to provide buffers against the side of a vessel 68. The lower ends of cylinders 142 are swivably connected at 143 to the lower ends of the support members 139 and cylindrical pistons 118 are swivably connected at 119 to the channels 41 and pass through stuffing boxes 120 to telescope into the cylinders 142. A liquid, as oil, fills the cylinders and pistons and partially fills tanks 121 suspended from the channels 41, flexible connections 122 being provided as liquid conduits between cylindrical pistons 118 and tanks 121. To maintain substantial resistance against angular movement of the vessel against the fenders due to rolling, the tanks 121 are partially filled with an inert gas to bear against the liquid therein with substantial pressure, but such initial pressure is not raised to such a point that full rigidity of the fenders is established, and a latitude of yieldability is permitted.

As shown in FIG. 10 the connection of a vessel to a ramp 40 is augmented by bow lines 123 and stern lines 124 which extend from the vessel to suitable bits 125 on a dock or on a larger vessel or water borne deck or platform 130 to which the vessel may be moored.

As a safeguard in such a case, guy lines 126 are connected to eyelets 127 on the lower end of the ramp 40 and to bits 125 on the dock or deck 130. In this manner the vessel may be held in position under a derrick thereabove, and is not free to swing with the sea, but can rise and fall with the waves and tides.

Conditions may exist, as shown in FIGS. 9 and 11, where it may be desirable to have a ramp 40 supported by an overhead suspension. In such cases the structural support arrangement 85 shown in FIG. 1 is substantially reversed so that the collar 86 slides on a column 21 which extends substantially above the platform 24. In such a construction a piston rod 91 is connected to a yoke 131 which in turn has a lower end pivotally connected at 129 on each side of the ramp 40 to the I-beams 42. The piston rod 91 extends through a stuffing box 90 and into a cylinder 89 and terminates therein in a head, not shown, while the cylinder 89 is connected at its upper end to a bracket 88 which in turn is pivotally connected at 87 to the collar 86. In this adaption a flexible line 98 extends from the lower end of the cylinder 89 below the piston head therein to the tank 97.

In such a construction the ramp 40 is supported by the force of the compressed gas in the tanks 97 urging the liquid therein out therefrom through the flexible line or conduit 98 into the cylinder 89 below the piston head therein, not shown, to bear upwardly on the piston head to lift the piston rod 91 attached thereto and with it the ramp 40 which is connected to the rod 91 by means of the yoke 131. Thus if the ramp 40 moves downwardly, as when a connected vessel 68 pulls thereon, as in response to wave motions or tidal fall, the piston rod 91 is pulled downwardly therewith, and the piston head, not shown, within the cylinder 89 forces the liquid downwardly through the flexible line or conduit 98 to tank 97 to compress the inert gas therein.

With such overhead suspension construction it may not be necessary on occasion, within certain working ranges of free-board variation and tidal differences or water level changes, to provide a fluid control and adjustment, and such may be eliminated. When required the equivalent of the operation of the pump 114 or the opening of the gate valve 110 may be carried out by respectively increasing the pressure of the gas in tanks 97 to force more liquid through flexible connection 98 into the cylinder 89 to lift the piston head, therein, not shown, and with it the ramp, as the rod 91 and yoke 131 making connection to the ramp 40 are also lifted. Conversely, to lower ramp position manually, the release of gas from tank 97 may be normally effected to accomplish such purpose.

When the limits of free-board variation and tidal differences are substantially great and substantial adjustment therefor may be required, and when the support structure 85 cannot easily be constructed within dimensional limits to operate as the only adjustment within such limits, adjustment equipment, see FIGS. 2 and 9, may be provided in the nature of the fluid control system 140 and the operative elements (cylinder 103), piston head (not shown in FIG. 9), piston rod 101, collar 86, yoke 88, and connection pin 87, by which operative connection is made with the support structure 85.

As an optional construction the yoke 131 may be eliminated and the ramp 40 supported in overhead suspension by means of a dual arrangement of piston rods 91 pivotally connected at 129 to each side of the upper ramp 37, stuffing boxes 90, cylinders 89, piston heads connected to the rods 91 within the cylinders 89, and flexible connections 98 leading to the tank 97. In such case the cylinders 89 have their upper ends rigidly connected to the yoke 88 thereabove.

In cases the support structure 85 may be effectively converted to dampen the descent and rise of the ramp 40 by introducing an orifice in the flexible connection 988 between the tank 97 and the cylinder 89. The functioning of the liquid control system in adjustment has been described hereinabove and such system is mountable upon the platform 24 or is optionally mountable upon the tower 136. In this modification of the invention, a derrick 132 may be provided on the tower 138 for the purpose of hoisting loads of material 133 from a vessel, as a barge 68, which may be connected to the ramp 40.

In operation connection may be made to a vessel with the utmost simplicity as it is only necessary to secure the chain 66 to the vessel by means of the compressor 69; such chain, in turn, being suspended from a cross pin 144 which is connected to the downwardly extending swivel half 61, to retain the spring 64. The only specialized equipment necessary to be provided upon any vessel is the hawse 67, capstan 72, and compressor 69, and as a matter of practice most vessels are conveniently equipped with hawses 67 and capstans 72. On the other hand all other essential equipment is provided as part of the ramp structure. (See FIG. 1 or FIG. 7.)

To secure the chain 66 to a vessel 68, a cable 70 is connected to the chain 66 and the chain is led through the hawse 67 on the vessel, over the compressor 69, and around the capstan 72 thereon. Then the capstan 72 is rotated in direction to wind up the cable 70 thereon and draw the chain 66 through the hawse 67 and over the compressor 69 and the lower end of the swivel half 61 partly into the hawse 67 so that the spring 64 is slightly compressed between the hawse 67 and the flange 63 which extends around the swivel half 61 and bears upwardly against the link or swivel half 58 as the spring 64 bears upwardly thereagainst. The chain 66 is then locked to the vessel 68 by the latching of the compressor 69 thereover, and the cable 70 may then be removed and faked down for running. In view of the fact that very little change of pressure occurs in the tank 97 as the ramp 40 assumes various angular positions, no great amount of exertion is required to pull the ramp 40 down in position for connection.

To release the connection between the vessel 68 and the ramp 40 the compressor 69 is unlocked either at the compressor or by remote control from the pilot house of the vessel. The pilot house and the remote control release means is not shown in this disclosure. Upon release, the slight upwardly acting force of release, as the spring 64 expands, is sufficient to raise the ramp 40. The vessel 68 may back away upon release, and the ramp-connected chain 66 and the cable 70, if connected to the chain 66, may be drawn through the hawse 67 to remain suspended from the ramp 40 in position to form connection to the next vessel to be moored.

Any force which tends to swing the ramp 40 is responded to by the automatic traversing of the platform 24 upon the fixed gear 22 upon the support column 21, when the clutch jaws 30, 32 are not engaged. This is accomplished by the pinion 26 which is supported by the platform 24 and positioned in mesh with the gear 22 and moves therearound responsive to forces urging the platform in traverse. As is obvious from the description of the support assembly 85 hereinabove described such as the structures between the collar 86 and the underside of the ramp section 37, support of the ramp 40 is provided. Also adjustment for variations in sea level and in vessel free-board are automatically made by virtue of movement of the piston 91 in the cylinder 89 and furthermore by the operation of the piston head 105 in the cylinder 103.

Additional flexibility of connection is provided in the swivel half or channel link 58 and the swivel half 61 which together form a universal connection between the end of the ramp 40 and a vessel since the channel link swivels in a plane transverse to the longitudinally extending axis of the ramp 40 while the pin or swivel half 61 is suspended from the channel link 58 to rotate in a plane extending through the longitudinal axis of the ramp 40.

In every case buffer springs 134 may be provided at the ends of the cylinders, such as the cylinder 89, to buff or dampen sudden and excessive downward movement of elements as the piston 91 within such cylinder. (See particularly FIG. 1.)

The tanks which are partially filled with gas and partially filled with liquid may be mounted wherever structurally feasible and such tanks require no more apparatus than the fittings 100 shown in FIG. 1 through which the gas or liquid may be supplied, and the connection 137, also shown in FIG. 1, through which liquid may pass into and out of the tank. Conventional drain and safety fittings are provided for all tanks.

This invention is not limited to the structures and modifications disclosed in the embodiments of the drawings, but also includes other structures to the extent that such may be included as part of the invention as encompassed by the broad spirit thereof and as claimed in the appended claims for which a broad scope of interpretation is merited.

What is claimed is:

1. In a universal mooring and ramp the combination of a cylindrical support post, a gear fixed thereto, a platform anti-frictionally mounted on the face of said gear to rotate concentrically thereon, a pinion mounted on said platform to rotatably mesh with said gear, a ramp including a first section pivotally connected to said platform to move in a vertical plane, a second ramp section inter-telescoping with said first section, means to rotate said pinion in mesh with said gear whereby said platform and said ramp connected thereto may be rotated, a first piston-fluid cylinder means connecting said sections, a compressed gas container connected to receive fluid forced thereinto by said piston, swivel means on the outer end of said second section including means to effect a releasable, universal connection to a seaborne vessel having a cooperative universal joint thereon, a collar vertically slidable upon said support post, a second piston-fluid cylinder means pivotally connected at one end to said collar and connected at the other end to support said ramp, a compressed gas container supported by said ramp and connected to receive fluid forced thereinto by the piston of said second piston-fluid cylinder means, a control fluid cylinder mounted on said support in vertically spaced relation from said collar, a control piston extending from said collar to operate in said control fluid cylinder, and a fluid system external to said control fluid cylinder and extending between the ends thereof and including check valves one on either side of said control fluid cylinder whereby said system is operable responsive to said control piston movement to automatically regulate piston position in said control fluid cylinder and to cooperate with said second piston-fluid cylinder means in accommodating for variations in water level and vessel free-board.

2. In a universal mooring and ramp the combination of a cylindrical support post, a platform supported thereby for free rotation, a ramp including a first section pivotably connected to said platform and a second section inter-telescoping therewith, a piston-liquid-compressed gas system connecting and snubbing telescoping of said sections, swivel means on the outer end of said second section including means to effect a releasable, universal connection to a seaborne vessel, a collar slidable upon said support, a second piston-fluid-compressed gas system pivotally connected at one end to said collar and connected at the other end to said first section to support said first section, a cylinder on said support post adapted to receive liquid at both ends, a piston operable therein and connected outwardly to said collar, and a control liquid system external to said cylinder and interconnecting the ends thereof and including check valves one on either side of said support post supported cylinder operable responsive to said control piston movement to automatically regulate piston position in said cylinder and to cooperate with said second piston-liquid cylinder means in accommodating for variations in water level and vessel free-board.

3. A universal mooring and ramp comprising a platform, a platform supporting means supporting said platform, cooperative means provided by said platform and said supporting means whereby said platform may be rotatably trained in deflection with relation to said platform supporting means, a first ramp section having a pivotal connection to said platform to pivot up and down about said connection, a second ramp section telescopically supported by said first ramp section to move in and out with relation thereto, universal connection providing means connected to said second ramp section and connectable to a cooperative connection means provided by a seaborne vessel to universally connect said second ramp section and said vessel, a collar connected to track upwardly and downwardly on said platform supporting means, a piston buffer angularly positioned between and connecting said upwardly and downwardly tracking collar and said first ramp section, and adjustment means to adjust said upwardly and downwardly tracking collar on said platform supporting means in various positions of vertical adjustment in which said adjustment means comprises a fluid control system including a double acting piston-cylinder with the rod of said double-acting piston connected below the cylinder therefor to said collar and with said fluid control system connected to each end of such cylinder and including check valves therein on either side of such cylinder to effect the adjustably positioning of said upwardly and downwardly tracking connection means on said platform supporting means.

References Cited in the file of this patent

UNITED STATES PATENTS

| | | |
|---|---|---|
| 2,448,335 | Wallace | Aug. 31, 1948 |
| 2,527,653 | Pierce | Oct. 31, 1950 |
| 2,617,131 | Harris | Nov. 11, 1952 |
| 2,641,785 | Pitts | June 16, 1953 |
| 2,689,965 | Fenton | Sept. 28, 1954 |
| 2,757,397 | Valentine | Aug. 7, 1956 |

FOREIGN PATENTS

| | | |
|---|---|---|
| 594,643 | Great Britain | Nov. 17, 1947 |